United States Patent [19]
Lavigne

[11] 3,732,945
[45] May 15, 1973

[54] SWITCHING CIRCUIT CONTROLLED STEERED BEAM TRANSDUCER

[75] Inventor: Jean C. Lavigne, Arlington, Mass.

[73] Assignee: Schlumberger Technology Corporation, New York, N.Y.

[22] Filed: May 20, 1970

[21] Appl. No.: 38,983

[52] U.S. Cl. ......... 181/.5 AG, 181/.5 OS, 181/.5 ED, 340/10
[51] Int. Cl. .............................................. G01v 1/40
[58] Field of Search ............... 181/.5 AG, .5 OS, 181/.5 ED; 340/10

[56] References Cited

UNITED STATES PATENTS

| | | | |
|---|---|---|---|
| 3,496,533 | 2/1970 | Semmelink | 181/.5 ED |
| 3,021,706 | 2/1962 | Cook et al. | 181/.5 ED |
| 3,037,185 | 5/1962 | Dewitz | 181/.5 ED |
| 3,368,196 | 2/1968 | Mazzagatti | 181/.5 AG |
| 3,136,381 | 6/1964 | Anderson | 181/.5 AG |
| 3,376,950 | 4/1968 | Grine | 181/.5 OS |
| 2,938,592 | 5/1960 | Charslle et al. | 181/.5 AG |
| 3,309,658 | 3/1967 | Summers | 181/.5 AG |

Primary Examiner—Benjamin A. Borchelt
Assistant Examiner—N. Moskowitz
Attorney—Ernest R. Archambeau, Jr., Donald H. Fidler, David L. Moseley, Edward M. Roney, William R. Sherman & Steward F. Moore

[57] ABSTRACT

An improved steered beam transducer which utilizes ceramic elements is described. A relatively low voltage power supply is utilized to excite the ceramic elements through a step-up transformer. The inductance of the secondary of the transformer is chosen to produce resonance with the ceramic elements at the operating frequency. Steering is accomplished by time delayed switching in the low voltage primary where the switches are controlled by variable delay means.

8 Claims, 3 Drawing Figures

Jean C. Lavigne
INVENTOR

SWITCHING CIRCUIT CONTROLLED STEERED BEAM TRANSDUCER

BACKGROUND OF THE INVENTION

The present invention relates to acoustic well logging apparatus and more particularly to acoustic transmitting means having directional characteristics wherein a steered beam controlled by a switching circuit means is transmitted.

Generally, those acoustic transmitters used in well logging operations are operated in such a manner that the maximum amplitude of the transmitted energy is propagated radially into the formations adjacent the borehole. This results in relatively deep penetration of the acoustic energy into the formations and consequent dissipation of that energy, greatly reducing that which is received at the receiving transducer. Reduction of the degree to which this energy is dissipated in the formation has been recognized as a factor which will greatly enhance acoustic logging results. It has been found that such improved acoustic logging results can be achieved if the maximum amplitude component of the transmitted signal is inclined toward the receiver at an angle to the radial axis. Such inclination or steering of the transmitted beam may result in emphasizing either the compressional wave energy impinging on the receiver or in emphasizing the components of the transverse acoustic wave energy reaching the receiver. The selection of the angle of inclination of the steered beam dictates that which is to be emphasized. The facility for controlling the angle of inclination so that the transverse or shear wave components are emphasized is of particular significance in those logging operations which are concerned with locating fractures and voids lying along the path of propagation of the acoustic energy.

Difficulties have often been encountered in providing for the directional transmission or reception of acoustic energy in the well logging environment. Some prior art devices have required transducer elements of complex configuration which are not readily housed in a well logging tool. Conventional well logging tools are of such dimension as to foreclose the use of complex and bulky transducer means which may be suitable for use in other environments. Although recent advances in the prior art have contributed greatly to the feasibility of using the steered beam transmitter and receiver, there has yet remained a significant problem in presently existing systems concerning the provision of power sources which are readily subjected to control through the means of economic and readily implemented switching circuit arrangements.

Accordingly, it is an object of the present invention to provide a directional acoustic transmitting system for use in well logging which avoids the necessity for providing complex high voltage switching circuits.

Another object of the present invention is to provide improved directional electroacoustic transducer apparatus having the desirable characteristics of being highly compact and efficient in operation and which can be readily housed in existing logging equipment.

A still further object of the present invention is to provide an electroacoustic transducer means for well logging whose directional characteristics can be readily controlled.

Briefly, in accordance with the present invention, the transmitting transducer means of a directional or steered beam system are comprised of a plurality of individual transducing elements which are longitudinally spaced from each other along a longitudinal axis which is generally situated parallel to the borehole axis. Each such element is transformer coupled to a common source of power. Moreover, control means are provided in the transformer primary circuits so that all transducers may be impulsed in a time phased relationship dictated by the common controlling means. Each of the transmitting transducer means preferably comprises a cylindrical ceramic element, deformable through the application of electrical energy from the power source. The coupling of these ceramic elements to the power source is accomplished through the use of a step-up transformer for each of the individual transducer means, such transformer having a secondary-to-primary winding ratio preferably of at least five-to-one. The common low voltage power supply provides a periodic current to the primary of the transformer by means of a charging capacitor. The introduction of the excitation current is dictated by a variable sequencing mechanism. The variable sequencing device controls the introduction of the excitation current into the primary winding of each individual transformer by use of switching means located in the primary circuit of each transformer.

The variable sequencing means may conveniently take the form of a pulse generator and pulse counting device which device is used to determine the times during which the switch controlling each individual transducer element is to be closed. This determination is variable according to the number of pulses counted between firing pulses and may be adjusted to give a means of controlling the introduction of current into each of the circuits.

The ability to adjust the duration of each of the currents comprises an important feature of the present invention. Control of the steering angle of the transmitted beam of energy is determined by the physical spacing of the transducer elements which remains constant and by the variable delay and the phased firing of any given circuit through the means of the variable sequencing of the opening and closing of the switch for any given circuit. This angle may also be changed by varying the frequency of the pulse generator used to drive the counting circuit. Means are provided for controlling the inclination angle along which the greatest amplitude is directed by varying only a single parameter which may be the time delay between closing the switch for each of the circuits associated with a single transducer element or alternatively may be the frequency of the pulse generator used to drive the sequencing means.

An additional feature of the present invention, and one which greatly enhances the results obtained from the logging operations in which it is employed, is that of the ability to maintain a constant relationship between capacitances and inductances in those portions of the circuits into which the high voltage electrical energy is introduced. Maintaining constant values has been recognized as a desirable feature in that the values of capacitance and inductance chosen are made to correspond to those which are necessary to maintain the mechanical vibrations of the ceramic elements in resonance. The acoustic energy thereby propagated is provided at an amplitude substantially enhanced over that propagated by earlier systems.

The foregoing and other objects, features and advantages of the invention will become more readily apparent from the following detailed description thereof, when taken in conjunction with the accompanying drawings in which:

DESCRIPTION OF THE PREFERRED EMBODIMENT

Figure 1:
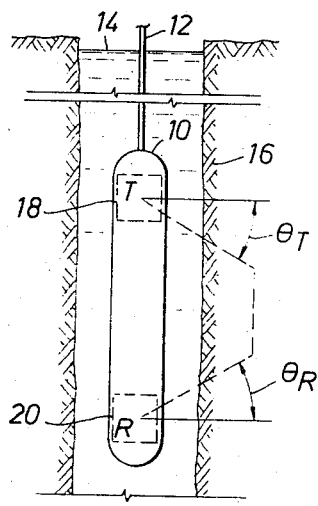
FIG. 1 is a diagrammatic representation of a logging tool in a borehole indicating a transmitter of the type to be controlled by the system of the present invention and a receiver to receive the energy thereby transmitted.

Referring initially to FIG. 1, an acoustic logging tool is suspended by means of a cable 12 in a fluid-filled well bore 14 drilled in the earth formations 16. In a conventional manner, the logging tool 10 is moved through the borehole 14 by means of a winch arrangement at the surface (not shown). The cable 12 is of conventional design and, as will be understood, includes all the necessary conductors for connecting a power source to the logging tool and for coupling signals between the tool and the equipment at the surface. Although the well logging tool depicted for illustrative purpose includes a single acoustic transmitter means 18 and a single acoustic receiver means 20, it will be understood that the present invention is applicable in those employing plural transmitters and/or receivers.

Those acoustic transmitters characteristically employed in well logging operations emit acoustic energy with the maximum amplitude component along an axis normal to the borehole axis. The directional pattern of conventional receivers is similar. This results in a substantially deeper penetration of adjacent formations by such acoustic energy and a consequent dissipation of the energy so that the energy which is received at the receiver is considerably diminished in amplitude, i.e., substantially less than the maximum amplitude of the emitted acoustic energy is available for measurement.

In the present invention as indicated in FIG. 1, acoustic energy, whose travel time between the transmitter and receiver is to be measured, follows a path from the transmitter T at an angle $\theta_t$ from the normal then generally parallel the borehole wall and finally to the receiver R at an angle $\theta_r$. It will be observed that if the transmitter and receiver have directional patterns such that the maximum output of response occurs at the respective angles $\theta_t$ and $\theta_r$, larger amplitude acoustic signals will be available for the measurement. It has also been found that the transverse or shear wave component of the acoustic wave transmitted to the formation can be emphasized by controlling the direction of transmission of energy to occur at a predetermined angle, and by adjusting the receiver to have a corresponding reception pattern. Rayleigh or shear wave logging has been found useful in detecting cracks and fractures in formations lying along the path of travel of the propagated acoustic energy.

Figure 2:
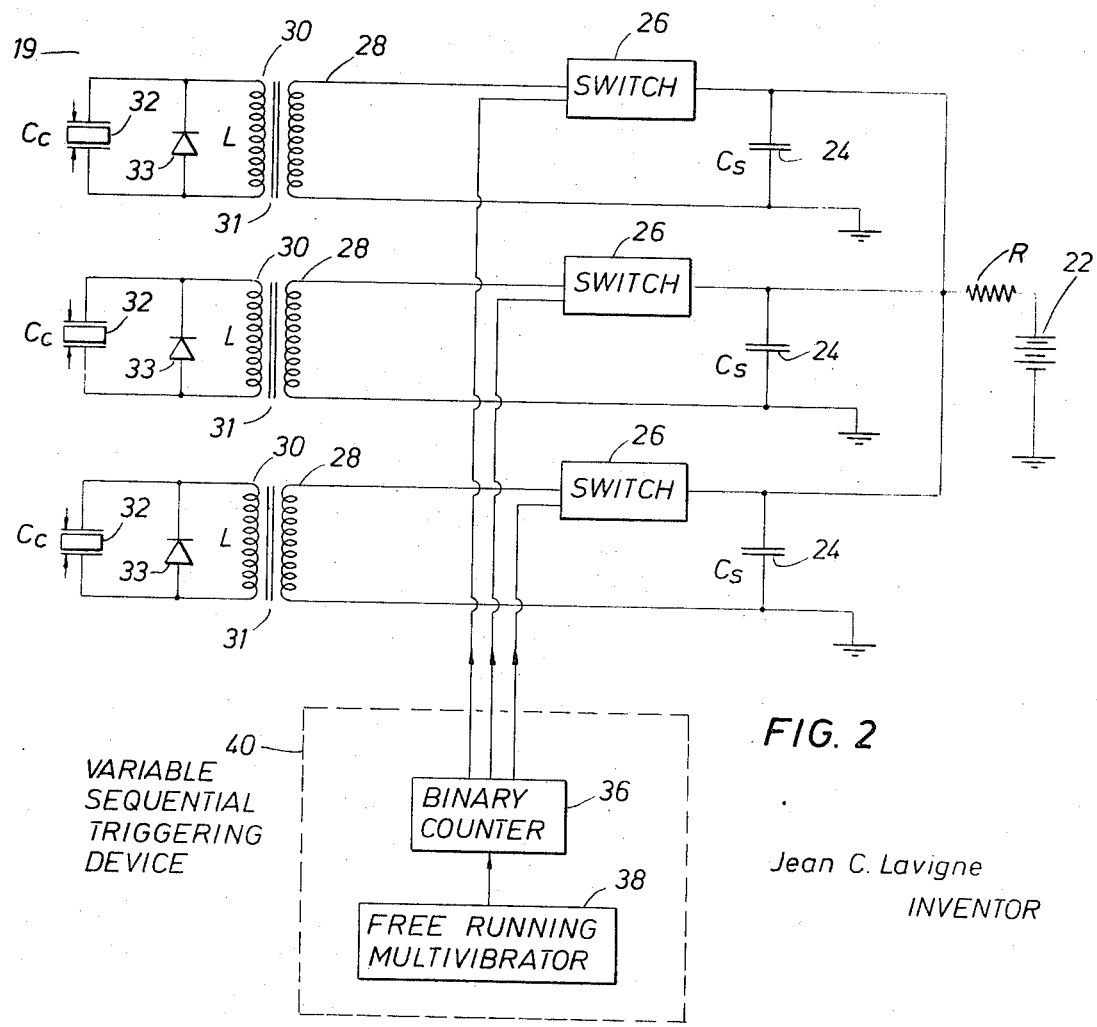
FIG. 2 is a diagram illustrating the circuitry of a transmitting transducer controlled in accordance with the invention.

Turning now to a consideration of the electrical circuitry depicted in FIG. 2, the transducer of the present invention is shown as comprising a plurality of cylindrically shaped piezoelectric ceramic elements 32 each of which comprises a circuit element connected to its respective transformer 31, such transformer providing inductive coupling to a low voltage power supply which is depicted as a battery 22. As is indicated by the arrows of FIG. 2, the ends of each of the cylindrically shaped ceramic elements 32 are clamped toward each other under pressure in the manner described in U.S. Pat. application Ser. No. 10,536 filed Feb. 10, 1970 and assigned to the assignee of the present invention.

A high voltage pulse occurs across each ceramic element 32 at such time as its corresponding switch 26 for the particular primary circuit under consideration is closed. This causes considerable mechanical deformation of the element 32. When the applied voltage changes suddenly the ceramic element 32 begins to mechanically vibrate, thereby emitting a high energy acoustic impulse.

The inductance L of the transformer secondary winding 30 and the capacitance $C_c$ of the cylindrical transducer elements are selected so that the circuit comprising these elements is caused to have an electrical oscillation frequency which closely approaches the mechanical radial resonance frequency of the cylindrical piezoelectric element 32. In practice, the inductance L required in order that electrical oscillations occur at frequency $\chi_r$ is determined for any given ceramic element 32 having a capacitance $C_c$ by the relation:

$$L = \chi_r^2 C_c \quad (1)$$

The criterion for selecting the inductance L represented by expression 1 disregards the inductance and resistance of the ceramic element 32. These values may be readily determined and having been so determined may be taken into account in refining the choice of inductance L, in a well-known manner.

The selection of values of inductance and capacitance to cause circuit oscillations at the resonance frequency serves to provide an acoustic impulse of maximum amplitude. The clamps between which the transducer element is secured have the effect of rapidly damping the mechanical oscillations of the transducer elements so that a sharper and more energetic acoustic impulse is produced over a shorter time interval lending greater definition to the pulse transmitted. Diode 33 further contributes to this result in the manner described in the above mentioned copending application. That is to say, electrical ringing or oscillation is reduced significantly by the switching action of the rectifying function of the diodes 33.

Time phased operation of the individual transducer elements 32 is accomplished through the sequential operation of switches 26 which are opened and closed in a sequence determined by variable sequential triggering device 40. Variable sequential triggering device 40 may conveniently take the form of a free running multivibrator 38, the output of which is applied to a binary counter 36. The operation of a particular switch 26 may then be made to be dependent upon the contents of binary counter 36. That is the appearance of a predetermined number of pulses from free running multivibrator 38 appearing in binary counter 36 can indicate that a switch currently open is to be closed. The duration of the current in any of the primary circuits may be dictated by the capacitance $C_s$ of charging capacitor 24, the resistance of the primary windings of transformers 31, and the timing of switch operation.

The functioning of variable sequential triggering device 40 may be as follows:

1. Assuming an initial pulse count of 0 in the counter 36 at time $t_o$, all switches 26 are open.
2. Free running multivibrator 38 generates pulses at a predetermined rate which may be variable but generally is chosen to be large when compared with that of the operation of any switch 26.
3. A given switch 26 is closed on a count of N (any arbitrary number) in binary counter 36.
4. Binary counter 36 is zeroed and a new count is initiated.
5. As any given switch is closed, the one whose operation precedes it in sequence is opened.
6. Steps 3, 4 and 5 are repeated as long as desired for the well logging operation.

Figure 3:
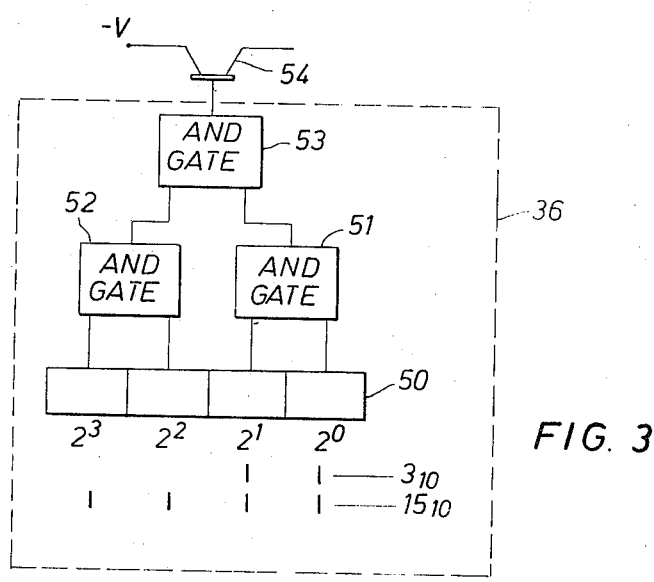
FIG. 3 is one embodiment of a switching means in accordance with the principles of the invention.

Referring now to FIGS. 2 and 3 conjunctively, suitable circuit means are shown for operating a switch in a manner consonant with the use of the switches 26 of the transformer primary circuits of FIG. 2. A four-bit register 50 is chosen as a typical binary device for providing, in a given sequence, pulses to transistor 54. As shown the stages of the register 50 are the source of pulses which are to be supplied to AND gates 51 and 52 and ultimately to AND gate 53 on the occurrence of a predetermined bit pattern in register 50. Transistor 54, which comprises the switch 26 of FIG. 2, in this case is reverse biased sufficiently to prevent conduction in the transformer primary circuit. When the predetermined desired count occurs a pulse is gated through AND gate 53 overcoming the bias and causing current to be conducted in that circuit during the desired time interval.

The cooperative operation of the circuit elements of FIG. 3 may be explained as follows: Four-bit register 50 is continuously incremented and thereby caused to repetitively count from 0-15, i.e., an overflow, or lost carry occurs every sixteenth count, which effectively causes re-cycling of the register. As register 50 is incremented pulses are supplied to the gates 51 and 52 causing them to emit pulses on the counts of 3 and 15 respectively. The pulse emitted on the count of 3 is supplied as one input to gate 53. Gating-in occurs at the count of 15, thereby causing gate 53 to supply a pulse to transistor 54 to achieve the desired result.

As will be understood binary counter 36 may be adjusted prior to initiation of the operating cycle so that the number of pulses to be counted between each operation of the switches 26 may be varied. Alternatively, the frequency of free running multivibrator 38 may be varied to increase the pulse repetition rate so that the cyclic rate of operation of the switches 26 may be adjusted while maintaining constant the operation time phase relationship among the switches 26. Through these alternative means the electrical delay between successive impulsing of the ceramic elements 32 may be accomplished. The longitudinal spacing between the successive elements and the electrical delay among successive elements determines the angle with respect to the borehole axis or the direction of the main energy lobe of the steered beam of acoustic energy.

The operating sequence of the elements in each of the primary circuits is identical. When the switch 26 is open capacitor 24 is charged through load resistor R by low voltage power supply 22. The closing of switch 26 causes a discharge of capacitor 24 through the primary winding 28 of the transformer 31. The sudden appearance of a voltage across the primary 28 of the transformer 31 induces a corresponding voltage in the secondary winding 30.

The magnitude of the voltage induced in secondary 30 is a function of the ratio of the windings in the secondary winding to those of the primary. Representative values for the low voltage source and the winding ratios are, respectively, 500 volts and five-to-one. Therefore, the sudden appearance of a potential of 500 volts across the primary 28 will induce a voltage of 2,500 volts in the secondary 30. The sudden application of a large voltage across the transducer element 32 causes the element, because of its piezoelectric nature, to mechanically vibrate. This generates an impulse of acoustic energy which is coupled into the borehole fluids surrounding the logging tool.

It will, of course, be appreciated by those skilled in the art that other embodiments than that disclosed in FIGS. 2 and 3 may be used to implement the concepts of the present invention. For example, the transistor switching means 54 of FIG. 3 may be replaced by a silicon control rectifiers (SCR) or other switching means if desired. Alternatively, the free-running multivibrator 38 and binary counter 36 could be replaced by the use of an initial oscillator (whose frequency could be variable if desired) coupled to a zero crossing detector. The zero crossing detector would generate a signal each time a half cycle of the oscillator occurred and a predetermined number of such signals could be utilized to activate a pulse generator. The pulse generator output could then in turn be delayed by a predetermined amount in a plurality of fixed delay lines. Thus, by varying the frequency of the initial oscillator, the angle (with respect to the borehole axis) of the steered beam could be varied. The fixed delay lines would establish the ratio of firing times of the individual transducer elements while the absolute frequency of the initial oscillator would determine the magnitude of the delay between transducer element firings.

Other modifications and configurations may be suggested to those skilled in the art by this disclosure without departing from the true spirit and scope of this invention. Accordingly, it is the aim in the appended claims to cover all such changes and modifications as come within the scope of the invention.

What is claimed is:

1. Apparatus for generating acoustic energy in a well bore, said energy having a predetermined directional characteristic, comprising:
   a plurality of acoustic transducer elements disposed in longitudinal spaced relationship to each other and adapted to be actuated by the application thereto of changes in electrical energy;
   a like plurality of electrical energy storage means;
   a like plurality of separate circuit means, each coupling one of said energy storage means to a respective one of said transducer elements; and
   separate switching means in each circuit means for, upon actuation, producing an electrical energy change in the respective transducer element; and
   adjustable means for actuating said separate switching means to cause said energy changes in the respective transducer elements in a predetermined sequence.

2. The apparatus of claim 1 wherein said adjustable means comprises pulse generating and counting means coupled to said switching means, said switching means being sequentially operated in response to impulses generated by said pulse generating and counting means on the successive occurrence of a given number of pulse counts.

3. The apparatus of claim 2 wherein each of said plurality of acoustic transducer elements comprises a piezoelectric element.

4. Apparatus for generating acoustical energy with a directional characteristic in a well bore comprising:
   a plurality of individual electroacoustic transducer elements disposed in a predetermined longitudinal relationship and adapted to be actuated by the application thereto of changes in electrical energy;
   a like plurality of electrical energy storage means for providing electrical energy at relatively low voltage;
   a like plurality of step-up transformer means, each having a primary winding and a secondary winding, said secondary windings being coupled across respective ones of said transducer elements and said primary windings being coupled with respective ones of said energy storage means;
   separate switching means operatively associated with each of said energy storage means and the respective primary winding for, upon actuation, producing an electrical energy change in the primary winding; and
   adjustable means for actuating said separate switching means to cause said energy changes in the respective primary windings in a predetermined sequence.

5. The apparatus of claim 4 wherein each of said transducer elements comprises a piezoelectric element and wherein the inductance of each of said secondary windings together with the capacitance of its associated piezoelectric element form an oscillatory circuit whose frequency is that of the radial resonant frequency of the piezoelectric element.

6. The apparatus of claim 4 wherein said adjustable means comprises a controllable variable frequency pulse source and means responsive to preselected pulses from said source to actuate said switching means in sequence.

7. The apparatus of claim 6 wherein said responsive means comprises a binary counter and gating means operable in response to predetermined counts reached by said counter.

8. The apparatus of claim 4 wherein each of said energy storage means is a capacitor and wherein there is further provided a unidirectional power supply of relatively low voltage coupled to all of said capacitors.

* * * * *